United States Patent
Rajagopal et al.

(10) Patent No.: US 10,492,028 B2
(45) Date of Patent: *Nov. 26, 2019

(54) LOCATING A USER DEVICE

(71) Applicant: Uber Technologies, Inc., San Francisco, CA (US)

(72) Inventors: Srinivasan Rajagopal, Mountain View, CA (US); Mohammed Waleed Kadous, Santa Clara, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/224,401

(22) Filed: Dec. 18, 2018

(65) Prior Publication Data

US 2019/0124472 A1 Apr. 25, 2019

Related U.S. Application Data

(63) Continuation of application No. 15/881,586, filed on Jan. 26, 2018, now Pat. No. 10,212,550, which is a continuation of application No. 15/396,222, filed on Dec. 30, 2016, now Pat. No. 9,924,320.

(51) Int. Cl.
*H04W 24/00* (2009.01)
*H04W 4/02* (2018.01)

(52) U.S. Cl.
CPC .................... *H04W 4/023* (2013.01)

(58) Field of Classification Search
CPC .................................................... H04W 4/023
USPC ..... 455/456.1, 456.3, 404.2, 466, 457, 67.11
See application file for complete search history.

(56) References Cited

U.S. PATENT DOCUMENTS

| | | | |
|---|---|---|---|
| 8,831,633 B2 | 9/2014 | Moshfeghi | |
| 9,179,328 B2 | 11/2015 | Li et al. | |
| 9,232,354 B2 * | 1/2016 | Smith | H04W 4/029 |
| 9,301,082 B2 | 3/2016 | Meyers et al. | |
| 9,344,848 B2 * | 5/2016 | Smith | H04W 4/029 |
| 9,363,784 B1 * | 6/2016 | Friday | H04W 64/003 |
| 9,473,893 B2 | 10/2016 | Kuramura et al. | |
| 9,513,375 B2 | 12/2016 | Moshfeghi | |

(Continued)

OTHER PUBLICATIONS

Australian First Examination Report, Australian Application No. 2017200651, dated Mar. 31, 2017, 6 pages.

(Continued)

*Primary Examiner* — Marceau Milord
(74) *Attorney, Agent, or Firm* — Fenwick & West LLP

(57) ABSTRACT

Embodiments of the present disclosure support improving determination of a location of a driver device that performs bandwidth constrained communication with a server, based on sensor data acquired by the driver device. The driver device reduces dimensionality of the acquired sensor data before transmitting the sensor data to the server over a communication network. The server receives GPS data and compressed sensor data from the driver device, and determines a quality metric related to the GPS data. Based on the quality metric, the server increases dimensionality of the compressed sensor data to reconstruct original sensor data acquired by the driver device. The server than augments the GPS data with the reconstructed sensor data, and determines location information of the driver device based on the augmented data.

20 Claims, 5 Drawing Sheets

(56) References Cited

U.S. PATENT DOCUMENTS

| | | | |
|---|---|---|---|
| 9,684,081 B2 | 6/2017 | Giurgiu et al. | |
| 9,709,660 B1 | 7/2017 | Bitra et al. | |
| 9,817,125 B2* | 11/2017 | Liu | G01S 19/22 |
| 9,838,997 B2* | 12/2017 | Smith | H04W 4/029 |
| 9,924,320 B1* | 3/2018 | Rajagopal | H04W 4/023 |
| 10,028,199 B2* | 7/2018 | Friday | H04W 64/003 |
| 2012/0310587 A1 | 12/2012 | Tu et al. | |
| 2013/0096817 A1 | 4/2013 | Fauci et al. | |
| 2014/0062790 A1* | 3/2014 | Letz | H04W 4/21 |
| | | | 342/386 |
| 2014/0221005 A1* | 8/2014 | Marshall | G01S 5/021 |
| | | | 455/456.1 |
| 2014/0274031 A1* | 9/2014 | Menendez | H04W 52/0209 |
| | | | 455/426.1 |
| 2014/0302810 A1* | 10/2014 | Inha | H04W 4/70 |
| | | | 455/404.1 |
| 2015/0050923 A1 | 2/2015 | Tu et al. | |
| 2015/0087264 A1* | 3/2015 | Goyal | G01S 19/34 |
| | | | 455/411 |
| 2015/0148075 A1 | 5/2015 | Alshihi | |
| 2015/0163210 A1 | 6/2015 | Meyers et al. | |
| 2015/0338430 A1* | 11/2015 | Gorjestani | G01P 15/00 |
| | | | 702/141 |
| 2017/0074659 A1 | 3/2017 | Giurgiu et al. | |
| 2017/0103588 A1* | 4/2017 | Rajani | G07C 5/0808 |
| 2017/0164315 A1* | 6/2017 | Smith | H04W 4/029 |
| 2017/0164318 A1* | 6/2017 | Smith | H04W 4/029 |
| 2017/0352257 A1* | 12/2017 | Oliver | H04W 4/30 |
| 2019/0150058 A1* | 5/2019 | Friday | H04W 64/003 |

OTHER PUBLICATIONS

United States Office Action, U.S. Appl. No. 15/396,222, dated Sep. 22, 2017, 20 pages.

United States Office Action, U.S. Appl. No. 15/881,586, dated Jul. 16, 2018, 21 pages.

* cited by examiner

LOCATING A USER DEVICE

CROSS REFERENCE TO RELATED APPLICATIONS

This application is a continuation of U.S. application Ser. No. 15/881,586 filed Jan. 26, 2018 which is continuation of U.S. application Ser. No. 15/396,222, filed Dec. 30, 2016, now U.S. Pat. No. 9,924,320, which is incorporated by reference in its entirety.

BACKGROUND

Described embodiments generally relate to determining location information, and more particularly relate to using sensor data acquired by a mobile user device to communicate the device's location to a server in a bandwidth-constrained environment.

Traditionally, in a system where a server communicates with a mobile user device, location of the mobile user device can be identified at the server using Global Positioning System (GPS) data obtained from the mobile user device. The server utilizes GPS data received from the mobile user device and performs map matching to determine location of the mobile user device. However, in certain areas known as urban canyons, GPS data obtained by the mobile user device can substantially drift over a short period of time, making it unreliable for accurate determination of the mobile user device's location.

SUMMARY

Disclosed embodiments enable determination of a location of a mobile device that is in communication with a server. The mobile device obtains positioning data such as GPS data, from which it calculates its position. The mobile device further acquires Inertial Measurement Unit (IMU) data having a first dimensionality or a first size. The mobile device processes (compresses) the acquired IMU data to reduce its dimensionality. The mobile device then transmits, over a communication network, the GPS data using a first transmission periodicity and the compressed IMU data using a second transmission periodicity that can be based on the reduced dimensionality.

The server receives the GPS data and compressed IMU data from the mobile device. In some embodiments, the server determines a quality metric related to the received GPS data. Based on the determination of the quality metric, the server processes the compressed IMU data to increase dimensionality of the compressed IMU data to its original dimensionality. In this way, the server reconstructs the IMU data acquired at the mobile device. The server then augments the received GPS data with the reconstructed IMU data to obtain augmented position data. The server can determine location information of the mobile device based on the augmented position data, and provides the determined location information to the mobile device via the communication network.

Figure 1:
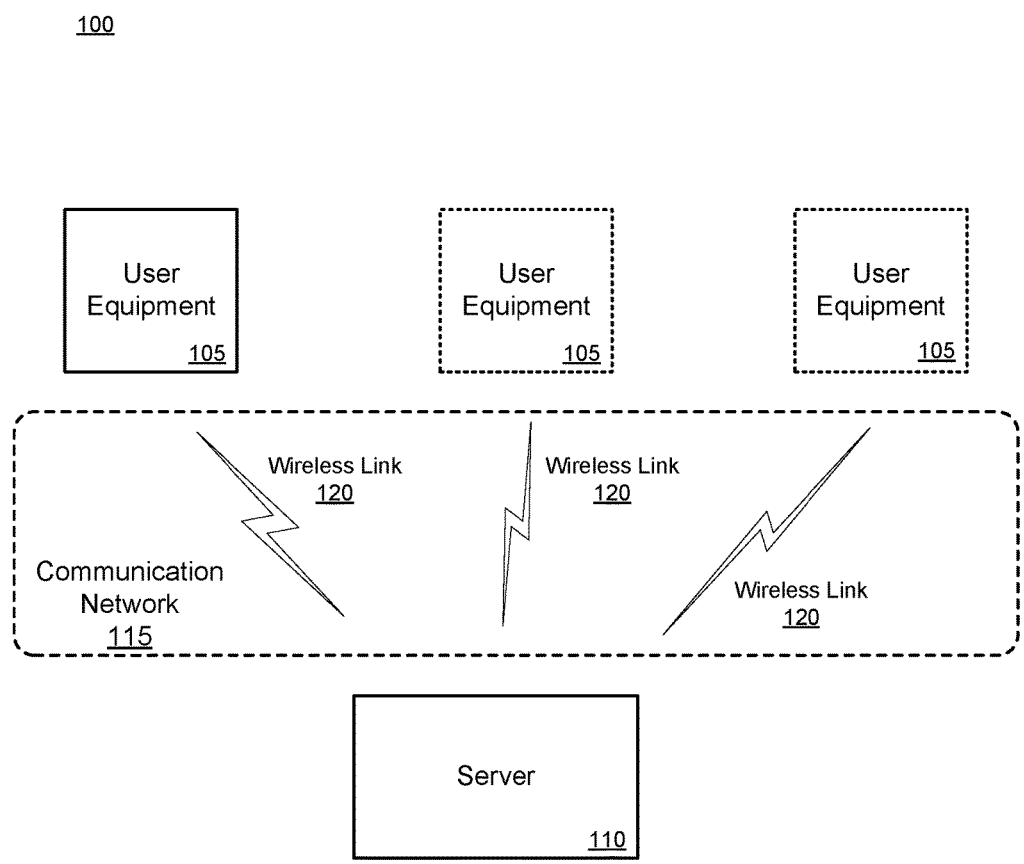
FIG. 1 is an example system comprising at least one user equipment (UE) communicating with a server via a communication network, in accordance with embodiments of the present disclosure.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

The techniques described herein may be used for various wireless communication systems. The teachings herein may be incorporated into (e.g., implemented within or performed by) a variety of wireless devices. A wireless device may provide, for example, connectivity for or to a network (e.g., a wide area network such as the Internet or a cellular network) via a wireless communication link. In some embodiments, a wireless device implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations, an access point may comprise a set top box kiosk, a media center, a server or any other suitable device that is configured to communicate via a wireless or wired medium.

An access terminal ("AT") may comprise, be implemented as, or known as an access terminal, a subscriber station, a subscriber unit, a mobile station, a remote station, a remote terminal, a user terminal, a user agent, a user device, user equipment, a user station, a device carried by a driver of a mobile vehicle (e.g., an automobile) or in the driver's automobile, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more embodiments taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium.

Described embodiments include methods and apparatuses for determining location information of a mobile user equipment that performs bandwidth constrained communication with a server, based on various sensor data acquired by the mobile user equipment. The mobile user equipment acts as an access terminal of a bandwidth constrained wireless communication system, whereas the server acts as an access point of the wireless communication system. The mobile user equipment may also correspond to a device carried by a driver of an automobile or a device carried in the driver's automobile. The methods presented herein are based on reducing, at the mobile user equipment, a dimensionality of the acquired sensor data. The mobile user equipment compresses the acquired sensor data and then transmits the compressed sensor data to the server for further processing and location determination. The server can be configured to reconstruct original sensor data from the received compressed sensor data by increasing dimensionality of the compressed sensor data to its original dimensionality. The server uses the reconstructed sensor data along with available GPS data to perform server side map matching to determine location information of the mobile user equipment. The described methods and apparatuses allow for constrained bandwidth and low latency communication between the mobile user equipment and the server, while preserving power dissipation at the mobile user equipment below a predetermined upper bound.

FIG. 1 is an example communication system 100 comprising at least one user equipment (UE) 105 communicating with a server 110 via a communication network 115, in accordance with embodiments of the present disclosure. The UE 105 is a smartphone or a tablet with GPS that is carried by a driver of an automobile or in the driver's automobile; the server 110 is a media center or a map server that is configured to determine a location of the UE 105 on a map and communicate the location information to the UE 105 via the communication network 115. As shown in FIG. 1, the server 110 can simultaneously communicate with more than one UE 105 via the communication network 115. The communication network 115 can correspond to a wide area network such as the Internet or a cellular network. Communication between each UE 105 and the server 110 can be achieved via a wireless medium, a wireless channel, or a wireless link 120 of the communication network 115, as shown in FIG. 1. In some embodiments, communication bandwidth and communication latency across the wireless link 120 can be constrained by predetermined upper bounds.

Figure 2:
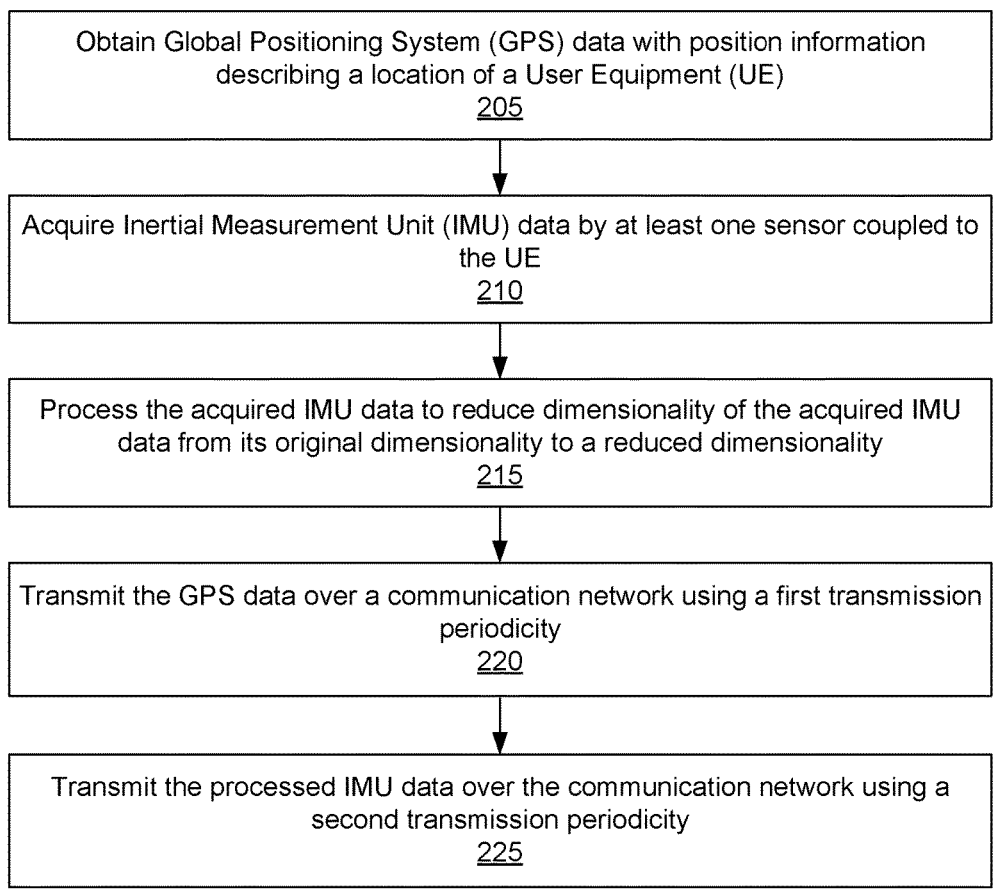
FIG. 2 is a flow chart illustrating a method that may be implemented at the UE in FIG. 1, in accordance with embodiments of the present disclosure.

FIG. 2 is a flow chart illustrating a method 200 that may be performed at the UE 105 in FIG. 1, in accordance with embodiments of the present disclosure. Operations of the method 200 begin as the UE 105 obtains 205 GPS data with position information describing a location of the UE 105. In an embodiment, the UE 105 obtains the GPS data with a frequency of approximately 1 Hz, i.e., approximately every 1 second. In alternate embodiments, the UE obtains the GPS data with a frequency smaller than 1 Hz (e.g., with a frequency of 0.25 Hz or 0.5 Hz) or with a frequency larger than 1 Hz (e.g., with a frequency of 2 Hz). In some embodiments, the UE 105 can have knowledge of a quality metric associated with the obtained GPS data, the quality metric indicating how reliable the GPS data are for location determination. In an embodiment, the UE can receive information about the quality metric of the GPS data from the server 110 via the communication network 115. If the quality metric of the GPS data is below a threshold indicating that the GPS data drift off and are not reliable for location determination, utilizing only the GPS data to determine location information of the UE 105 is not sufficient. In this case, the GPS data can be augmented with additional sensor data acquired by the UE 105 to improve determination of location information in relation to the UE 105.

Figure 4:
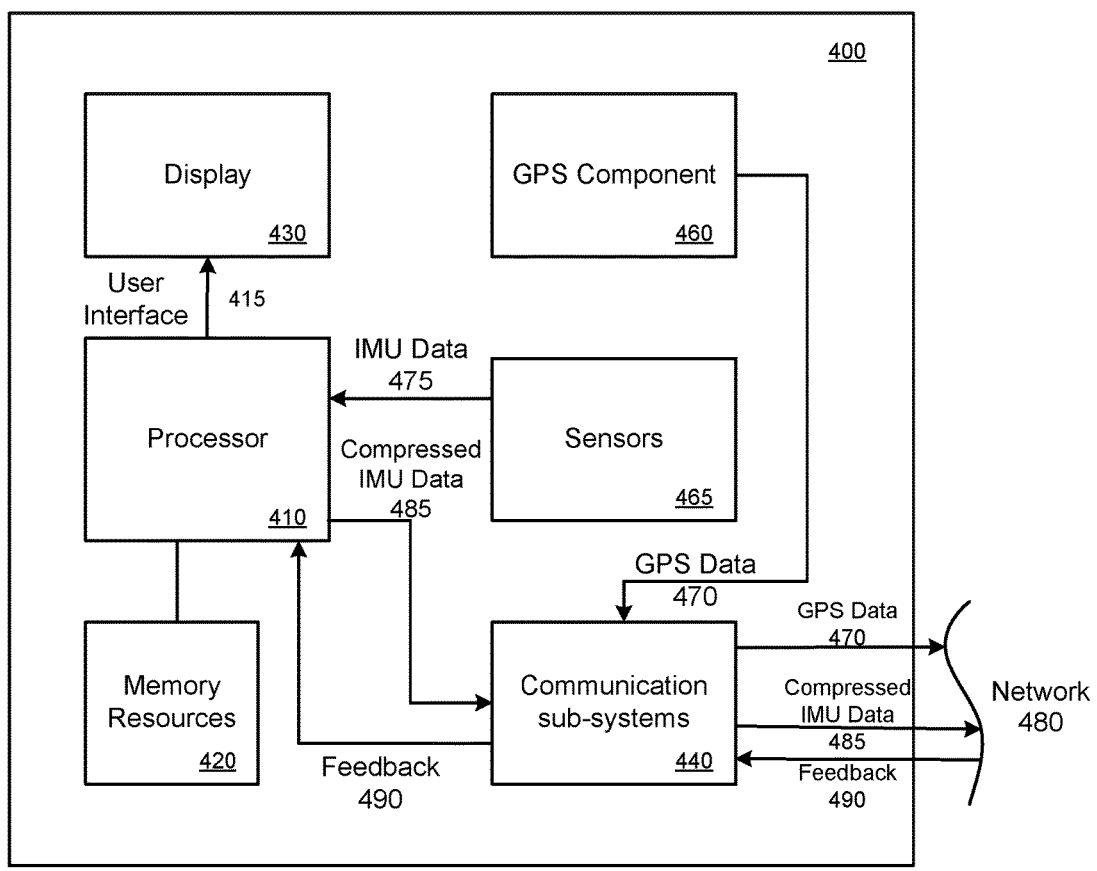
FIG. 4 is a block diagram that illustrates a mobile computing device upon which embodiments described herein may be implemented.

The UE 105 acquires 210 sensor data by at least one sensor coupled to the UE 105, such as by at least one sensor 465 of a computing device 400 shown in FIG. 4. The computing device 400 is an embodiment of the UE 105. In some embodiments, the acquired sensor data comprise Inertial Measurement Unit (IMU) data, which may be obtained by an Inertial Measurement Unit (IMU) coupled to the UE 105. The IMU is an electronic device that generates fast calibration data based on measurement signals received from one or more sensors coupled to the UE 105, such as position sensors. The one or more sensors of the UE 105 generate one or more measurement signals in response to motion of the UE 105. In some embodiments, the UE 105 comprises an accelerometer, a gyroscope, a magnetometer, a spatial triangulation sensor, or other position sensors. Thus, the sensors 465 of the computing device 400 in FIG. 4 may include an IMU, an accelerometer, a gyroscope, a magnetometer, a spatial triangulation sensor, etc.

In an illustrative embodiment, the UE 105 acquires the IMU data with a frequency of approximately 25 Hz, which means that the UE 105 acquires the IMU data more often than the GPS data. In general, a frequency of acquiring the IMU data is greater than a frequency of obtaining GPS data. A dimensionality (size) of the acquired IMU data can be high, and higher than a dimensionality of the GPS data, due to a number of sensors involved in acquiring the IMU data and a frequency of updating the sensors' measurements when acquiring the IMU data. The size of the IMU data is related to an amount of the IMU data acquired and collected before transmitting the IMU data to the server 110. In an example embodiment, this collected amount of the IMU data is higher than an amount of GPS data collected before its transmission to the server 110 because of a number of sensor measurements involved in acquiring the IMU data and a higher frequency of acquiring the IMU data in comparison with a frequency of obtaining the GPS data, e.g., the frequency of 25 Hz for updating the sensors' measurements to acquire the IMU data vs. the frequency of 1 Hz for obtaining the GPS data. Because of that, if the UE 105 directly transmits, via the wireless link 120 of the communication network 115, the acquired IMU data to the server 110 for processing and location determination, a bandwidth and latency of the wireless link 120 would be prohibitively expensive, as the bandwidth and the latency would be larger than predetermined upper bounds. In some embodiments, in order to achieve bandwidth and latency requirements, the UE 105 applies encoding (compression) of the IMU data to reduce dimensionality of the IMU data before transmitting the IMU data across the communication network 115 to the server 110.

The UE 105 processes (e.g., compresses) 215 the acquired IMU data to reduce dimensionality of the acquired IMU data from its original dimensionality to a reduced dimensionality. In an embodiment, the UE 105 reduces dimensionality of the acquired IMU data based on variational auto encoding of the IMU data. In another embodiment, the UE 105 reduces dimensionality of the acquired IMU data based on applying fingerprinting based encoding to the acquired IMU data. Other compression schemes can be also applied at the UE 105 for reducing dimensionality of the acquired IMU data.

The UE 105 transmits 220 the GPS data over the communication network 115 using a first transmission periodicity. In an embodiment, the first transmission periodicity is related to a frequency of obtaining GPS data. In an illustrative embodiment, the first transmission periodicity can be approximately 1 second that corresponds to the frequency of obtaining GPS data of approximately 1 Hz. In other illustrative embodiments, the first transmission periodicity can be approximately 4 seconds, 2 seconds, or 0.5 second corresponding to the frequency of obtaining GPS data of approximately 0.25 Hz, 0.5 Hz, or 2 Hz, respectively. The UE 105 can transmit 220 the GPS data to the server 110 over the communication network 115 using the wireless link 120.

The UE 105 transmits 225 the processed (e.g., compressed) IMU data to the server 110 over the communication network 115 using a second transmission periodicity. In some embodiments, the second transmission periodicity of transmitting the compressed IMU data is related to the reduced dimensionality of the compressed IMU data. For example, to achieve a constant or nearly constant communication bandwidth between the UE 105 and the server 110, the second transmission periodicity is set to a smaller (or larger) value and the compressed IMU data are transmitted more (or less) frequently if a size of the compressed IMU data is smaller (or larger). In an embodiment, the UE 105 can transmit 225 the compressed IMU data to the server 110 over the communication network 115 using the wireless link 120. The UE 105 transmits 225 the compressed IMU data separately and independently of transmitting the GPS data. As discussed in more detail below in conjunction with FIG. 3 and FIG. 5, server 110 uses the GPS data and the compressed IMU data to improve determination of location information in relation to the UE 105. In some embodiments, as discussed, a dimensionality of the acquired IMU data can be reduced based on a compression scheme applied at the UE 105. By compressing the acquired IMU data and reducing its dimensionality, a communication bandwidth associated with transmission of the compressed IMU data over the wireless link 120 is reduced below an upper bound. In some embodiments, the upper bound for the communication bandwidth is predetermined by a network controller (not shown in FIG. 1) or by the server 110 at the time when the wireless link 120 is established.

In some embodiments, the UE 105 transmits 225 the compressed IMU data over the communication network 115 using the second transmission periodicity that depends on a frequency of performing the compression scheme at the UE 105. The UE 105 transmits 225 the compressed IMU data over the communication network 115 more often if the compression scheme is performed more frequently, and vice versa. The UE 105 may receive a feedback from the server 110 indicative of a location of the UE 105 on a map and/or a quality of the GPS data. Based on the feedback, the UE 105 adjusts a frequency of performing the compression scheme. If the feedback indicates that the UE 105 is located in one of predefined critical regions on the map where the GPS data are not reliable (or the UE 105 is located within a threshold vicinity from a predetermined critical region and is approaching the predetermined critical region), the UE 105 transmits the compressed IMU data more frequently and also increases the frequency of performing the compression scheme. Alternatively, if the feedback indicates that the UE 105 is located outside any predefined critical region on the map and the GPS data are reliable, the UE 105 transmits the compressed IMU data less frequently or even stops transmitting the compressed IMU data. In this case, the UE 105 decreases the frequency of performing the compression scheme or even stops performing the compression scheme to save power.

In some embodiments, the UE 105 transmits 225 the compressed IMU data over the communication network 115 using the second transmission periodicity that depends on a compression rate of the compression scheme. For example, if the compression rate is higher causing that dimensionality reduction of IMU data is larger and a size of the compressed IMU data is smaller, the UE 105 is able to transmit the compressed IMU data more often and still keep communication bandwidth below a predetermined upper bound. Alternatively, if the compression rate is smaller causing that dimensionality reduction of IMU data is smaller and a size of the compressed IMU data is larger, the UE 105 transmits the compressed IMU data less often in order to preserve communication bandwidth below a predetermined upper bound.

In some embodiments, a periodicity of transmitting compressed IMU data across the communication network 115 can be a dynamic function of at least one of: a location of the UE 105, or GPS data previously obtained by the UE 105 and provided to the server 110. Information about the location of the UE 105 can be known at the UE 105. In an embodiment, the server 110 communicates, via the communication network 115 to the UE 105, a feedback signal comprising the location information of the UE 105. If the UE 105 is either approaching or is already located in one of predefined critical regions on a map, such as in one of areas known as urban canyons where GPS significantly drifts off within a short time period, the UE 105 is configured to transmit the compressed IMU data to the server 110 more frequently, i.e., the periodicity of transmitting the compressed IMU data decreases. Alternatively, if the UE 105 is located outside any predetermined critical region, the UE 105 is configured to transmit the compressed IMU data to the server 110 less frequently or even to stop transmission of the compressed IMU data. Therefore, the UE 105 is configured to adjust a periodicity of transmitting the compressed IMU data based on location information of the UE 105, which may be communicated to the UE 105 from the server 110.

In some embodiments, the UE 105 has knowledge about position information describing a location of the UE 105. In an embodiment, the UE 105 obtains the position information from an on-board GPS receiver. In an alternate embodiment, the UE receives a feedback signal from the server 110 with position information describing a location of the UE 105 on a map. If the position information indicates that the UE 105 is located within a threshold vicinity from a predetermined critical region on the map and the UE 105 is approaching the predetermined critical region, the UE 105 adjusts transmission of the compressed IMU data by decreasing a transmission periodicity and the compressed IMU data are transmitted more frequently. The UE 105 may also perform compression of the IMU data more frequently. As discussed above, a frequency of performing the compression scheme increases as the frequency of performing the compression scheme is related to the transmission periodicity of the compressed IMU data. Alternatively, if the position information indicates that the UE 105 is located outside a threshold vicinity from a predetermined critical region on a map and the UE 105 is moving away from the predetermined critical region, the UE 105 adjusts transmission of the compressed IMU data by increasing a transmission periodicity, and the UE transmits the compressed IMU data less frequently or the UE 105 stops transmitting the compressed IMU data. In this case, the UE 105 may perform compression of the IMU data less frequently or even stop performing compression of the IMU data. As the compression is performed less frequently or not performed at all, power consumption at the UE 105 decreases.

In some embodiments, the UE 105 receives from the server 110 a feedback signal with information about a quality metric associated with GPS data previously obtained by the UE 105 and communicated to the server 110. The server 110 may obtain the quality metric of the GPS data and compare the metric with a predetermined threshold value to establish whether the GPS data are reliable for accurate location determination. In an embodiment, the server 110 predetermines the threshold value by inferring locations of multiple UEs 105 in communication with the server 110 based only on GPS data received from the UEs 105, while the UEs 105 are located at known test locations. In some embodiments, the server 110 reduces an upload frequency of the IMU data received from the one or more UEs 105 when the server 110 has information that the one or more UEs 105 are located in known "good areas" where the GPS data are reliable for accurate location determination. The server 110 may also instruct the one or more UEs 105 to send the IMU data more frequently, when the server 110 has information that the one or more UEs 105 are located in known "bad areas" where the GPS data are not reliable for accurate location determination. The server 110 may utilize both the GPS data when the one or more UEs 105 are located in known "good areas" and the GPS data when the one or more UEs 105 are located in known "bad areas" to set up a threshold value for the quality metric of GPS data. If the quality metric of the GPS data is below the predetermined threshold value indicating that the GPS data are not reliable for accurate location determination, the UE 105 adjusts transmission of the compressed IMU data by decreasing a transmission periodicity, i.e., the UE 105 transmits the compressed IMU data more frequently. The UE 105 may also perform compression of the IMU data more frequently to adjust supply of the compressed IMU data to the decreased transmission periodicity. Alternatively, if the quality metric of GPS data is above the predetermined threshold value indicating that the GPS data are reliable for accurate location determination, the UE 105 adjusts transmission of the compressed IMU data by increasing a transmission periodicity, i.e., the UE 105 transmits the compressed IMU data less frequently or the UE 105 stops transmitting the compressed IMU data. In this case, the UE 105 may also perform compression of the IMU data less frequently or even stop performing compression of the IMU data to save power consumption as the GPS data are sufficient for accurate determination of location information. Furthermore, when the quality of metric is above the threshold value, the UE 105 may be configured to reduce a frequency of updating the sensors' measurements for acquiring the IMU data in order to lower power consumption and optimize operation of the UE 105.

In some embodiments, the UE 105 can be also configured to dynamically adjust a compression rate of a compression scheme applied at the UE 105 to reduce dimensionality of the acquired IMU data, based on the feedback signal received from the server 110. In an embodiment, as discussed above, the UE 105 receives from the server 110 the feedback signal with information about location of the UE 105 on the map and/or information about the quality metric of the GPS data. If the received feedback signal indicates that the UE 105 is located within a threshold vicinity from a predetermined critical region on the map and the UE 105 is approaching the predetermined critical region and/or the quality metric of GPS data is below a predetermined threshold value, the UE 105 may adjust compression of the IMU data by increasing the compression rate or selecting a compression scheme with a higher compression rate to further reduce dimensionality of the compressed IMU data. Due to the higher compression rate and reduced dimensionality (size) of the compressed IMU data, the UE 105 is able to transmit the compressed IMU data over the communication network 115 more frequently while keeping a communication bandwidth and communication latency below predetermined upper bounds. Alternatively, if the received feedback signal indicates that the UE 105 is located outside a threshold vicinity from a predetermined critical region on the map and the UE 105 is moving away from the predetermined critical region and/or the quality metric of GPS data is above the predetermined threshold value, the UE 105 may adjust compression of the IMU data by decreasing the compression rate or selecting a compression scheme with a lower compression rate to increase dimensionality of the compressed IMU data. By compressing the IMU data with a lower compression rate, the UE 105 may consume less power as a compression scheme is less computationally intensive in this case. Due to a lower compression rate, a dimensionality (size) of the compressed IMU data is higher. However, the UE 105 is able to preserve communication bandwidth below a predetermined upper bound as the UE 105 transmits the compressed IMU data over the communication network 115 less frequently.

Figure 3:
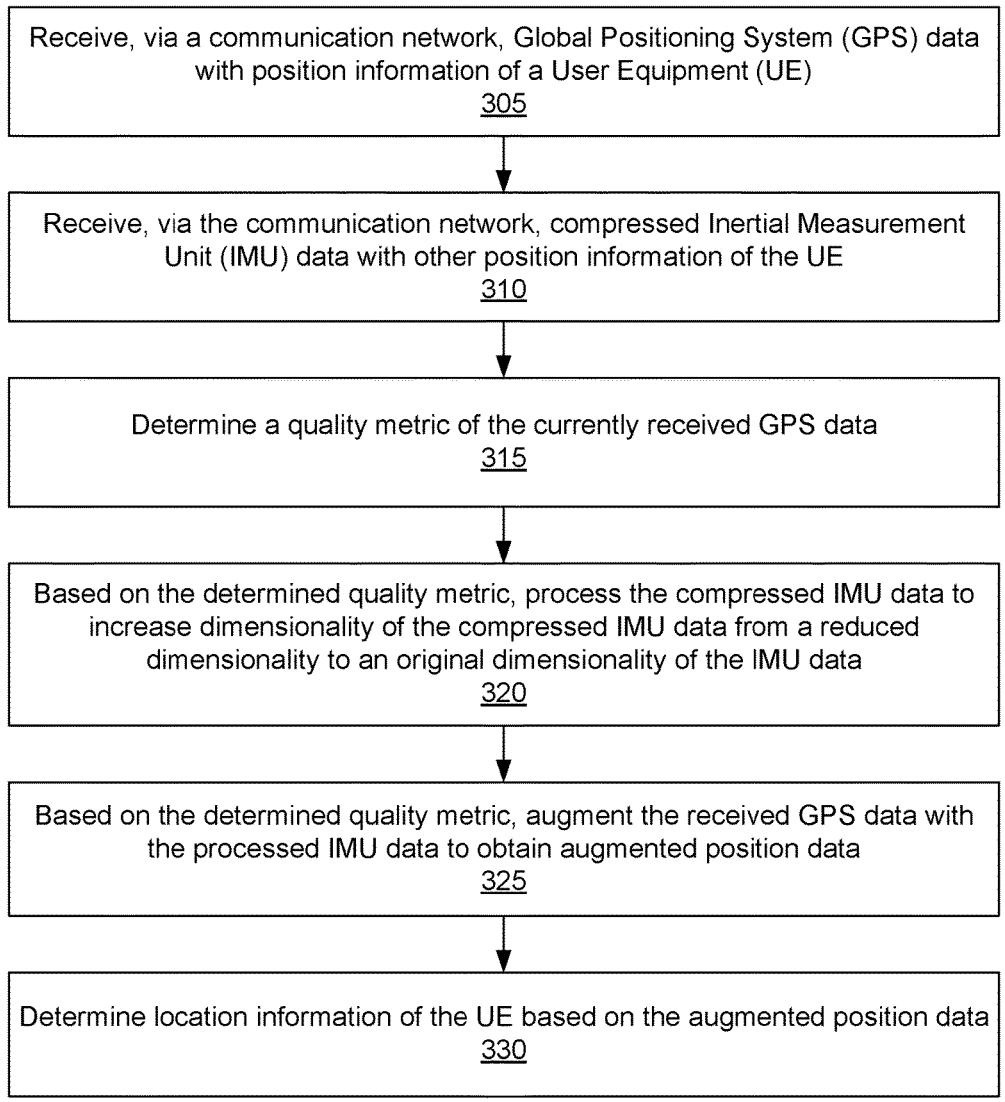
FIG. 3 is a flow chart illustrating a method that may be implemented at the server in FIG. 1, in accordance with embodiments of the present disclosure.

FIG. 3 is a flow chart illustrating a method 300 that may be performed at the server 110 in FIG. 1, in accordance with embodiments of the present disclosure. Operations of the method 300 begin as the server 110 receives 305, from the UE 105 via the communication network 115, GPS data with position information of the UE 105. As discussed above, in an embodiment, a periodicity of receiving the GPS data can be approximately 1 second, which corresponds to a frequency of approximately 1 Hz of obtaining the GPS data at the UE 105. In alternate embodiments, a periodicity of receiving the GPS data can be approximately 4 seconds, 2 seconds, 0.5 seconds, or some other periodicity, which corresponds to a frequency of obtaining the GPS data at the UE 105 of approximately 0.25 Hz, 0.5 Hz, 2 Hz, or some other frequency, respectively.

The server 110 receives 310, from the UE 105 via the communication network 115, compressed IMU data with other position information of the UE 105. In some embodiments, as discussed, the received compressed IMU data represent a compressed version of IMU data acquired at one or more sensors of the UE 105. Therefore, the received compressed IMU data have a dimensionality (size) smaller than an original dimensionality of the IMU data as acquired by the one or more sensors of the UE 105. The server 110 receives 310 the compressed IMU data from the UE 105 independently and separately from reception 305 of the GPS data.

The server 110 determines 315 a quality metric of the currently received GPS data. In an embodiment, the server 110 determines first location information of the UE 105 to check where the UE 105 was located at last reporting of GPS data prior to reporting 305 of the current GPS data. The UE 105 determines the first location information based at least in part on the last reported GPS data prior to reporting 305 of the current GPS data. The server 110 also determines second location information of the UE 105 based only on the currently received GPS data. Then, the server 110 determines a location drift based on comparison between the first location information and the second location information. The server 110 further compares the determined location drift with an expected legitimate movement of the UE 105 for a time period between two consecutive receptions of GPS data (e.g., 1 second) calculated based on information about velocity of the UE 105 known at the server 110. If the location drift is substantially different from the expected legitimate movement of the UE 105, the server 110 establishes that the currently received GPS data are not reliable for accurate location determination. The server 110 further sets a value of the quality metric below a predetermined threshold value to indicate that the current GPS data are not reliable. Alternatively, if the location drift is same as or approximately same as the expected legitimate movement of the UE 105, the server 110 establishes that the currently received GPS data are reliable. Then, the server 110 sets a value of the quality metric above the predetermined threshold value indicating that the current GPS data are reliable.

In some embodiments, if the determined quality metric of the received GPS data is below the predetermined threshold value indicating that the quality of GPS data is unsatisfactory for accurate determination of location information of the UE 105, the server 110 augments the received GPS data using the received IMU data to improve position data in relation to the UE 105. Based on the determined quality metric, the server 110 can process 320 (e.g., decompress) the compressed IMU data to increase dimensionality of the compressed IMU data from the reduced dimensionality to the original dimensionality and to reconstruct original IMU data as acquired by the UE 105. In one or more embodiments, the server 110 utilizes decompression (decoding) scheme that depends on compression (encoding) scheme applied at the UE 105 for processing of the acquired IMU data. Thus, in one embodiment, the server 110 can apply variational auto decoding to reconstruct the IMU data. In another embodiment, the server 110 can apply fingerprinting based decoding to reconstruct the IMU data. Other decoding and decompression schemes can be also applied at the server 110 for reconstructing the original IMU data.

Based on the determined quality metric of GPS data being below the predetermined threshold value, the server 110 augments 325 the received GPS data with the processed (reconstructed) IMU data to obtain augmented position data in relation to location information of the UE 105. Thus, in order to improve determining location information of the UE 105, the server 110 combines (fuses) the currently received GPS data with the reconstructed (decompressed) IMU data received from the UE 105. In one embodiment, the received GPS data can be fused with the reconstructed IMU data based on the Kalman filtering of the GPS data and the reconstructed IMU data applied at the server 110. In another embodiment, the server 110 fuses the received GPS data with the reconstructed IMU data based on the centralized filter fusion. In yet another embodiment, the server 110 fuses the received GPS data with the reconstructed IMU data based on the federated filter fusion. In yet another embodiment, the server 110 fuses the received GPS data with the reconstructed IMU data based on a Hidden Markov Model (HMM). For generating the HMM, a prior can be n-minute GPS state, where n is an integer or a fraction (e.g., n=2, and a prior is based on GPS data obtained every two minutes). Both GPS data and IMU data can be used to create a prior with possible transition states, whereas GPS data, IMU data and road network data can be used to compute transition costs. Other methods for fusion of the reconstructed IMU data and the GPS data can be also applied at the server 110.

The server 110 determines 330 location information of the UE 105 based on the augmented (fused) position data. In some embodiments, the server 110 performs map matching based on the augmented (fused) position data to determine 330 the location information of the UE 105. The server 110 then provides the determined location information to the UE 105, e.g., via the wireless link 120 of the communication network 115.

In some embodiments, the server 110 generates a feedback signal based on the determined quality metric of the received GPS data, and the server 110 transmits the feedback signal to the UE 105, e.g., via the wireless link 120 of the communication network 115. If the feedback signal indicates that the determined quality metric is below a predetermined threshold value meaning that the GPS data are not reliable, the feedback signal may comprise an instruction for the UE 105 to start transmitting compressed IMU data more frequently. In contrast, if the feedback signal indicates that the determined quality metric is above the predetermined threshold value meaning that the GPS data are reliable, the feedback signal may comprise an instruction for the UE 105 to start transmitting compressed IMU data less frequently or even to stop transmitting the compressed IMU data. When the quality metric of GPS data is above the predetermined threshold value, the server 110 may be able to accurately determine location information of the UE 105 based only on the received GPS data.

In some embodiments, the server 110 generates a feedback signal based on location information of the UE 105, and the server 110 transmits the feedback signal to the UE 105, e.g., via the wireless link 120 of the communication network 115. The location information of the UE 105 can be determined either based on the augmented position data or only on the currently received GPS data. If the UE 105 is located within a threshold vicinity from a predetermined critical region on a map and the UE 105 is approaching the predetermined critical region, the feedback signal may comprise an instruction for the UE 105 to start transmitting compressed IMU data more frequently. Alternatively, if the UE 105 is located outside a threshold vicinity from a predetermined critical region on a map and the UE 105 is moving away from the predetermined critical region, the feedback signal may comprise an instruction for the UE 105 to start transmitting compressed IMU data less frequently or even to stop transmitting the compressed IMU data.

Hardware Diagrams

FIG. 4 is a block diagram that illustrates a computing device 400 upon which embodiments described herein may be implemented. In one embodiment, the computing device 400 may correspond to a mobile computing device, such as a cellular device that is capable of telephony, messaging, and data services. The computing device 400 can correspond to a client device, a device carried by a driver of an automobile, or a device carried in the driver's automobile. Examples of such devices include smartphones, handsets or tablet devices for cellular carriers. The computing device 400 is an embodiment of the UE 105 described above in conjunction with FIGS. 1-3. The computing device 400 includes a processor 410, memory resources 420, a display device 430 (e.g., such as a touch-sensitive display device), one or more communication sub-systems 440 (including wireless communication sub-systems), input mechanisms 450 (e.g., an input mechanism can include or be part of the touch-sensitive display device), a location detection mechanism based on a GPS component 460, and one or more sensors 465 (e.g., an IMU, an accelerometer, a gyroscope, a magnetometer, a spatial triangulation sensor, etc.). In one example, at least one of the communication sub-systems 440 sends and receives cellular data over data channels and voice channels.

The processor 410 is configured with software and/or other logic to perform one or more processes, operations and other functions described with implementations, such as described by FIGS. 1-3, and elsewhere in the application. The processor 410 is configured, with instructions and data stored in the memory resources 420, to perform operations as described in FIGS. 1-3. The processor 410 can provide a variety of content to the display 430 by executing instructions and/or applications that are stored in the memory resources 420. One or more user interfaces 415 can be provided by the processor 410.

The GPS component 460 obtains GPS data with position information of the computing device 400. The GPS component 460 may be a GPS receiver configured to determine GPS data in relation to the computing device 400. In an embodiment, the GPS component 460 obtains the GPS data with a frequency of approximately every 1 Hz, i.e., with a periodicity of approximately 1 second. In alternate embodiments, the GPS component 460 obtains the GPS data with a frequency of 0.25 Hz, 0.5 Hz, 2 Hz, or with some other frequency. The GPS component 460 may provide GPS data 470 obtained at the GPS component 460 to the communication sub-systems 440.

The sensors 465 comprise an IMU, an accelerometer, a gyroscope, a magnetometer, a spatial triangulation sensor, or other position sensors. The sensors 465 generate measurement signals, i.e., IMU data 475, in response to motion of the computing device 400. The sensors 465 provide the acquired IMU data 475 to the processor 410 for further processing. In an embodiment, the sensors 465 acquire the IMU data 475 with a frequency of approximately 25 Hz. Thus, the IMU data 475 are generated more often than the GPS data 470. Because of that, dimensionality (size) of the IMU data 475 may be prohibitively high, as a bandwidth and latency of wireless communication of the IMU data 475 across a communication network 480 may be prohibitively high. In some embodiments, the processor 410 can apply an encoding (compression) scheme to reduce dimensionality of the IMU data 475 and generate compressed IMU data 485. The processor 410 provides the compressed IMU data 485 to the communication sub-systems 440 for transmission over the communication network 480.

The processor 410 is configured to process the IMU data 475 received from the sensors 465 to reduce dimensionality (size) of the IMU data 475 and generate the compressed IMU data 485 with a reduced dimensionality. In an embodiment, the processor 410 is configured to perform variational auto encoding of the IMU data 475 to generate the encoded (compressed) IMU data 485. In another embodiment, the processor 410 is configured to perform fingerprinting based encoding of the IMU data 475 to generate the encoded (compressed) IMU data 485. Other compression schemes can be also applied at the processor 410 to reduce dimensionality of the IMU data 475.

The communication sub-systems 440 may independently and separately receive the GPS data 470 from the GPS component 460 and the compressed IMU data 485 from the processor 410. A wireless communication transmitter included in the communication sub-systems 440 may transmit, to another computer system via a wireless link of the communication network 480, the GPS data 470 using a first transmission periodicity. The wireless communication transmitter in the communication sub-systems 440 may further transmit, to the other computer system via the wireless link of the communication network 480, the compressed IMU data 485 using a second transmission periodicity that may be related to the reduced dimensionality of the compressed IMU data 485. By reducing dimensionality of the IMU data 475, a bandwidth and latency for transmission of the compressed IMU data 485 over the communication network 480 is reduced below a predetermined upper bound.

In some embodiments, transmission of the compressed IMU data 485 across the network 480 can be dynamic function of at least one of a location of the computing device 400 or the GPS data 470 previously obtained by the computing device 400 and provided to another computer system (server). In one embodiment, information about the location of the computing device 400 on a map can be provided within a feedback signal 490 transmitted, via the communication network 480, from the other computer system and received at a wireless communication receiver of the communication sub-systems 440. If the feedback signal 490 indicates that the computing device 400 is located in one of predefined critical regions on the map (e.g., areas known as urban canyons where the GPS data 470 significantly drifts off within a short time period) or the computing device 400 is located within a threshold vicinity from a predetermined critical region and is approaching the predetermined critical region, the wireless communication transmitter of the communication sub-systems 440 is configured to transmit the compressed IMU data 485 more frequently and a periodicity of transmitting the compressed IMU data 485 decreases. Alternatively, if the feedback signal 490 indicates that the computing device 400 is located outside any predefined critical region on the map or the computing device 400 is located outside a threshold vicinity from a predetermined critical region and is distancing from the predetermined critical region, the wireless communication transmitter of the communication sub-systems 440 is configured to transmit the compressed IMU data 485 less frequently or even to stop transmitting the compressed IMU data 485. The feedback signal 490 indicative of location of the computing device 400 on the map can be further provided to the processor 410. Based on the feedback signal 490, the processor 410 may adjust a frequency of processing (e.g., compression) of the IMU data 475 that should be related to a periodicity of transmitting the compressed IMU data 485 over the communication network 480. In one embodiment, if, based on the feedback signal 490, the transmission of the compressed IMU data 485 stops, the processor 410 may be configured to stop processing the IMU data 475, which reduces power consumption at the computing device 400.

In another embodiment, the feedback signal 490 can comprise information about a quality metric associated with GPS data 470 previously obtained by the computing device 400 and communicated to another computer system via the communication network 480. If the feedback signal 490 indicates that the quality metric is below a predetermined threshold value meaning that the GPS data 470 are not reliable, the wireless communication transmitter of the communication sub-systems 440 is configured to transmit the compressed IMU data 485 more frequently across the communication network 480. Alternatively, if the feedback signal 490 indicates that the quality metric is above the predetermined threshold meaning that the GPS data 470 are reliable, the wireless communication transmitter of the communication sub-systems 440 is configured to transmit the compressed IMU data 485 less frequently across the communication network 480 or even to stop transmitting the compressed IMU data 485. The feedback signal 490 indicative of the quality of metric of the GPS data 470 can be further provided to the processor 410. Based on the feedback signal 490, the processor 410 may adjust a frequency of processing (e.g., compression) of the IMU data 475 that should be related to a periodicity of transmitting the compressed IMU data 485 over the communication network 480.

In some embodiments, the processor 410 can be also configured to dynamically adjust, based on the feedback signal 490, a compression rate of a compression (encoding) scheme that is applied to reduce dimensionality of the acquired IMU data 475. The feedback signal 490 may comprise at least one of location information of the computing device 400 on a map or information about a quality metric of GPS data. If the feedback signal 490 indicates that the computing device 400 is located within a threshold vicinity from a predetermined critical region on the map and the computing device 400 is approaching the predetermined critical region and/or the quality metric of GPS data is below a defined threshold, the processor 410 may adjust compression of the IMU data 475 by increasing the compression rate or selecting a compression scheme with a higher compression rate to further reduce dimensionality of the compressed IMU data 485. Due to the higher compression rate and reduced dimensionality (size) of the compressed IMU data 485, the computing device 400 is able to transmit the compressed IMU data 485 over the communication network 480 more frequently while keeping a transmission bandwidth and transmission latency below predetermined upper bounds. Alternatively, if the feedback signal 490 indicates that the computing device is located outside a threshold vicinity from a predetermined critical region on the map and the computing device is moving away from the predetermined critical region and/or the quality metric of GPS data is above a defined threshold, the processor 410 may adjust compression of the IMU data 475 by decreasing the compression rate or selecting a compression scheme with a lower compression rate to increase dimensionality of the compressed IMU data 485. By compressing the IMU data 475 with a lower compression rate, the processor 410 may save consumption power as a compression scheme is less computationally intensive. Due to a lower compression rate, a dimensionality (size) of the compressed IMU data 485 is higher. However, the computing device 400 is able to preserve a transmission bandwidth and transmission latency below predetermined upper bounds as the wireless communication transmitter of the communication sub-systems 440 transmits the compressed IMU data 485 over the communication network 480 less frequently.

Figure 5:
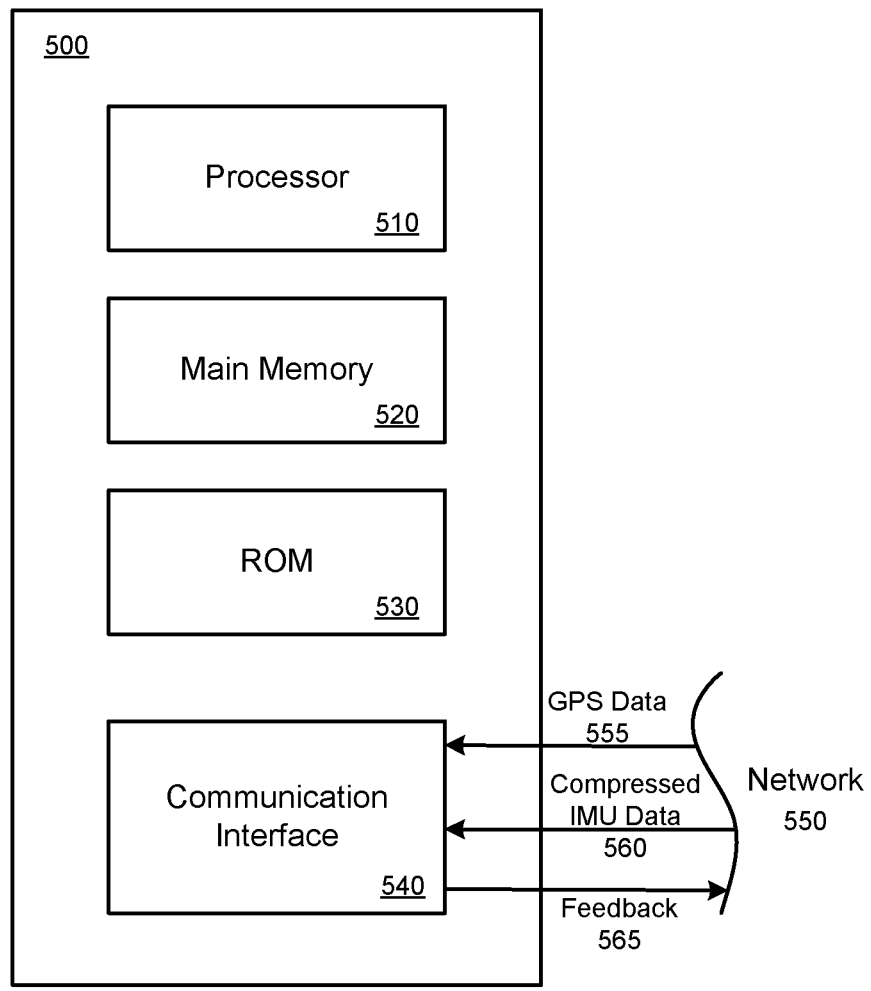
FIG. 5 is a block diagram that illustrates a computer system upon which embodiments described herein may be implemented.

FIG. 5 is a block diagram that illustrates a computer system 500 upon which embodiments described herein may be implemented. The computer system 500 can correspond to a server device. Examples of such devices include base stations or access points for cellular carriers. The computer system 500 is an embodiment of the server 110 described above in conjunction with FIGS. 1-3.

In one implementation, the computer system 500 includes at least one processor 510, a main memory 520, a read only memory (ROM) 530, and a communication interface 540. The computer system 500 includes the at least one processor 510 for processing information and the main memory 520, such as a random access memory (RAM) or other dynamic storage device, for storing information and instructions to be executed by the processor 510. The main memory 520 also may be used for storing temporary variables or other intermediate information during execution of instructions to be executed by the processor 510. The computer system 500 may also include the ROM 530 or other static storage device for storing static information and instructions for the processor 510.

The communication interface 540 can enable the computer system 500 to communicate with one or more networks 550 (e.g., cellular network) through use of the network link (wireless or wireline). Using the network link, the computer system 500 can communicate with one or more computing devices, and one or more servers. In some variations, the computer system 500 can communicate with a driver device via the network link. Data received from the driver device can be processed by the processor 510 to determine location information corresponding to the driver device. The determined location information can be transmitted over the network 550 to the driver device of a driver that has been selected to provide a transport service for a user.

The communication interface 540 receives, via a wireless link of the network 550, GPS data 555 related to a computing device in communication with the computer system 500, e.g., the computing device 400 in FIG. 4. In an embodiment, a periodicity of receiving the GPS data 555 is approximately 1 second, which corresponds to a frequency of approximately 1 Hz for obtaining the GPS data 555 at the computing device 400. In alternate embodiments, a periodicity of receiving the GPS data 555 can be approximately 4 seconds, 2 seconds, or 0.5 second corresponding to the frequency of obtaining GPS data of approximately 0.25 Hz, 0.5 Hz, or 2 Hz, respectively. In one or more embodiments, the received GPS data 555 may be stored at the ROM 530 and/or the main memory 520 and used by the processor 510 for determining location information of the computing device 400.

The communication interface 540 receives, via a wireless link of the network 550, compressed IMU data 560 generated at the computing device 400. The compressed IMU data 560 may represent a compressed version of IMU data acquired at the one or more sensors 465 of the computing device 400. Therefore, the compressed IMU data 560 have a dimensionality smaller than an original dimensionality of the IMU data as acquired at the computing device 400. The communication interface 540 receives the compressed IMU data 560 independently and separately from reception of the GPS data 555. In one or more embodiments, the received compressed IMU data 560 may be stored at the ROM 530 and/or the main memory 520 and used by the processor 510 for determining location information of the computing device 400.

In some embodiments, the processor 510 determines a quality metric of the received GPS data 555. The processor 510 determines first location information of the computing device 400 to check where the computing device 400 was located at last reporting of GPS data prior to reporting of the current GPS data 555. The processor 510 determines the first location information based at least in part on the last reported GPS data received from the computing device 400 prior to reception of the current GPS data 555. The processor 510 also determines second location information of the computing device 400 based only on the currently received GPS data 555. Then, the processor 510 determines a location drift based on comparison between the first location information and the second location information. The processor 510 further compares the determined location drift with an expected legitimate movement of the computing device 400 for a time period between two consecutive receptions of GPS data (e.g., 1 second) calculated based on information about velocity of the computing device 400 known by the processor 510. If the location drift is substantially different from the expected legitimate movement of the computing device 400, the processor 510 establishes that the currently received GPS data 555 are not reliable for accurate location determination. The processor 510 further sets a value of the quality metric below a predetermined threshold value to indicate that the current GPS data 555 are not reliable. Alternatively, if the location drift is same as or approximately same as the expected legitimate movement of the computing device 400, the processor 510 establishes that the currently received GPS data 555 are reliable for accurate location determination. Then, the processor 510 sets a value of the quality metric above the predetermined threshold value indicating that the current GPS data 555 are reliable.

If the determined quality metric of the received GPS data 555 is below the predetermined threshold value meaning that the GPS data 555 are not reliable, the received GPS data 555 are augmented with the compressed IMU data 560 to improve position information describing a location of the computing device 400. Based on the determined quality metric being below the predetermined threshold value, the processor 510 decompresses (decodes) the compressed IMU data 560 to reconstruct originally acquired IMU data. In some embodiments, the processor 510 may utilize a decompression (decoding) scheme that depends on compression (encoding) scheme applied at the processor 410 of the computing device 400. Thus, in one embodiment, the processor 510 can apply variational auto decoding to reconstruct the IMU data. In another embodiment, the processor 510 can apply fingerprinting based decoding to reconstruct the IMU data. Other decoding and decompression schemes can be also applied at the processor 510 for reconstructing the IMU data. After reconstructing the original IMU data, the processor 510 fuses (combines) the GPS data 555 with the reconstructed original IMU data to obtain fused position data. The processor 510 then performs map matching based on the fused position data to determine location information of the computing device 400. The communication interface 540 provides the determined location information to the computing device 400 via a wireless link of the network 550.

In some embodiments, the processor 510 generates a feedback signal 565 indicative of a position of the computing device 400 on a map, based on the determined location of the computing device 400. The feedback signal 565 may further comprise information about the quality metric of the received GPS data 555. As discussed above, the location of the computing device 400 on the map can be determined at the processor 510 either based on the received GPS data 555 being fused with the reconstructed IMU data or based only on the received GPS data 555. Also, the processor 510 is configured to determine the quality of the received GPS data 555. The communication interface 540 transmits the feedback signal 565 to the computing device 400, wherein the feedback signal 565 may comprise an instruction for the computing device 400 to adjust a periodicity of transmitting the compressed IMU data 560. In an embodiment, if the determined location of the computing device 400 is within a threshold vicinity from a predefined critical region on a map and the computing device 400 is approaching the predefined critical region and/or the quality metric of the GPS data 555 is below a predetermined threshold value indicating that the GPS data 555 are not reliable, the feedback signal 565 may comprise an instruction for the computing device 400 to begin transmitting the compressed IMU data 560 more frequently. In another embodiment, if the determined location of the computing device 400 is outside a threshold vicinity from a predefined critical region on a map and the computing device 400 is moving away from the predefined critical region and/or the quality metric of the GPS data 555 is above the predetermined threshold value indicating that the GPS data 555 are reliable, the feedback signal 565 may comprise an instruction for the computing device 400 to transmit the compressed IMU data 560 less frequently or even to stop transmitting the compressed IMU data 560.

Examples described herein are related to the use of the computer system 500 for implementing the techniques described herein. According to one embodiment, those techniques are performed by the computer system 500 in response to the processor 510 executing one or more sequences of one or more instructions contained in the main memory 520. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An apparatus comprising:
   a receiver configured to obtain global positioning system (GPS) data for the apparatus;
   at least one sensor configured to acquire sensor data associated with the apparatus;
   a processor configured to process the acquired sensor data; and
   a transmitter configured to:
   periodically transmit the GPS data over a communication network with a first transmission periodicity, and
   periodically transmit the processed sensor data over the communication network with a second transmission periodicity, the second transmission periodicity adjusted over time based at least in part on information about a location of the apparatus.

2. The apparatus of claim 1, wherein:
   the receiver is further configured to receive a feedback signal from another apparatus indicative of the location of the apparatus; and
   the transmitter is further configured to adjust transmission of the processed sensor data by adjusting the second transmission periodicity, based on the received feedback signal.

3. The apparatus of claim 2, wherein the received feedback signal is further indicative of a quality metric of the GPS data, and the transmitter is further configured to:
   adjust transmission of the processed sensor data by decreasing the second transmission periodicity, when the quality metric is below a predetermined threshold value; and
   adjust transmission of the processed sensor data by increasing the second transmission periodicity, when the quality metric is above the predetermined threshold value.

4. The apparatus of claim 1, wherein the transmitter is further configured to:
   adjust transmission of the processed sensor data by decreasing the second transmission periodicity, when the location of the apparatus is within a threshold vicinity from a defined region; and
   adjust transmission of the processed sensor data by increasing the second transmission periodicity, when the location of the apparatus is outside the threshold vicinity from the defined region.

5. The apparatus of claim 1, wherein:
   the receiver is further configured to receive a feedback signal from another apparatus indicative of the location of the apparatus; and
   the processor is further configured to adjust processing of the acquired sensor data, based on the received feedback signal.

6. The apparatus of claim 1, wherein:
   the receiver is further configured to receive a feedback signal from another apparatus indicative of a quality metric of the GPS data; and
   the processor is further configured to adjust processing of the acquired sensor data, based on the received feedback signal.

7. The apparatus of claim 1, wherein the at least one sensor comprises at least one of: an Inertial Measurement Unit (IMU), an accelerometer, a gyroscope, a magnetometer, and a spatial triangulation sensor coupled to the apparatus.

8. A method comprising:
   obtaining, at an apparatus, global positioning system (GPS) data for the apparatus;
   acquiring, by at least one sensor coupled to the apparatus, sensor data associated with the apparatus;
   processing the acquired sensor data;
   periodically transmitting the GPS data over a communication network with a first transmission periodicity; and
   periodically transmitting the processed sensor data over the communication network with a second transmission periodicity, the second transmission periodicity adjusted over time based at least in part on information about a location of the apparatus.

9. The method of claim 8, wherein the second transmission periodicity is further based on a quality metric of the GPS data.

10. The method of claim 8, further comprising:
    receiving, at the apparatus, a feedback signal from another apparatus indicative of the location of the apparatus; and
    adjusting transmission of the processed sensor data by adjusting the second transmission periodicity, based on the received feedback signal.

11. The method of claim 10, wherein the received feedback signal is further indicative of a quality metric of the GPS data, and the method further comprising:
    adjusting transmission of the processed sensor data by decreasing the second transmission periodicity, when the quality metric is below a predetermined threshold value; and
    adjusting transmission of the processed sensor data by increasing the second transmission periodicity, when the quality metric is above the predetermined threshold value.

12. The method of claim 8, further comprising:
    adjusting transmission of the processed sensor data by decreasing the second transmission periodicity, when the location of the apparatus is within a threshold vicinity from a defined region; and
    adjusting transmission of the processed sensor data by increasing the second transmission periodicity, when the location of the apparatus is outside the threshold vicinity from the defined region.

13. The method of claim 8, further comprising:
    receiving, at the apparatus, a feedback signal from another apparatus indicative of the location of the apparatus; and
    adjusting processing of the acquired sensor data, based on the received feedback signal.

14. The method of claim 8, further comprising:
    receiving, at the apparatus, a feedback signal from another apparatus indicative of a quality metric of the GPS data; and
    adjusting processing of the acquired sensor data, based on the received feedback signal.

15. The method of claim 8, wherein processing the acquired sensor data comprises encoding of the acquired sensor data.

16. The method of claim 8, wherein processing the acquired sensor data comprises variational auto encoding of the acquired sensor data to reduce dimensionality of the acquired sensor data.

17. A non-transitory computer-readable medium comprising computer-executable instructions that, when executed by one or more processors of an apparatus, cause the one or more processors to:
obtain global positioning system (GPS) data for the apparatus;
acquire sensor data associated with the apparatus;
process the acquired sensor data;
periodically transmit the GPS data over a communication network with a first transmission periodicity; and
periodically transmit the processed sensor data over the communication network with a second transmission periodicity, the second transmission periodicity adjusted over time based at least in part on information about a location of the apparatus.

18. The computer-readable medium of claim 17, wherein the instructions further cause the one or more processors to:
receive a feedback signal from another apparatus indicative of the location of the apparatus; and
adjust transmission of the processed sensor data by adjusting the second transmission periodicity, based on the received feedback signal.

19. The computer-readable medium of claim 18, wherein the received feedback signal is further indicative of a quality metric of the GPS data, and the instructions further cause the one or more processors to:
adjust transmission of the processed sensor data by decreasing the second transmission periodicity, when the quality metric is below a predetermined threshold value; and
adjust transmission of the processed sensor data by increasing the second transmission periodicity, when the quality metric is above the predetermined threshold value.

20. The computer-readable medium of claim 17, wherein the instructions further cause the one or more processors to:
adjust transmission of the processed sensor data by decreasing the second transmission periodicity, when the location of the apparatus is within a threshold vicinity from a defined region; and
adjust transmission of the processed sensor data by increasing the second transmission periodicity, when the location of the apparatus is outside the threshold vicinity from the defined region.

* * * * *

UNITED STATES PATENT AND TRADEMARK OFFICE
CERTIFICATE OF CORRECTION

PATENT NO. : 10,492,028 B2  
APPLICATION NO. : 16/224401  
DATED : November 26, 2019  
INVENTOR(S) : Srinivasan Rajagopal et al.

Page 1 of 1

It is certified that error appears in the above-identified patent and that said Letters Patent is hereby corrected as shown below:

On the Title Page

Abstract (57), Line 12: "The server than augments the GPS data with the" to read as --The server then augments the GPS data with the--

Signed and Sealed this  
Fifth Day of May, 2020

Andrei Iancu  
*Director of the United States Patent and Trademark Office*